United States Patent [19]
Borkenhagen et al.

[11] Patent Number: 6,088,788
[45] Date of Patent: *Jul. 11, 2000

[54] BACKGROUND COMPLETION OF INSTRUCTION AND ASSOCIATED FETCH REQUEST IN A MULTITHREAD PROCESSOR

[75] Inventors: John M. Borkenhagen; Richard J. Eickemeyer; Sheldon B. Levenstein; Andrew H. Wottreng; Duane A. Averill, all of Rochester; James I. Brookhouser, Byron, all of Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,572

[22] Filed: Dec. 27, 1996

[51] Int. Cl.⁷ .............................. G06F 9/40; G06F 15/76
[52] U.S. Cl. ...................... 712/205; 712/229; 712/23; 712/43; 711/140
[58] Field of Search ...................................... 395/381, 676, 395/800.23, 800.42, 800.43, 382, 570, 582; 712/205, 206, 23, 42, 43, 229, 235; 709/106, 102; 711/140

[56] References Cited

U.S. PATENT DOCUMENTS

| | | | |
|---|---|---|---|
| 5,148,536 | 9/1992 | Witek et al. | 711/140 |
| 5,197,138 | 3/1993 | Hobbs et al. | 712/222 |
| 5,287,508 | 2/1994 | Hejna, Jr. et al. | 709/102 |

(List continued on next page.)

FOREIGN PATENT DOCUMENTS

| | | | |
|---|---|---|---|
| 2050828 | 9/1991 | Canada | G06F 9/46 |
| 0565849 | 10/1993 | European Pat. Off. | G06F 9/44 |
| 1125638 | 5/1989 | Japan | G06F 12/08 |

(List continued on next page.)

OTHER PUBLICATIONS

Shuichi Sakai et al., "Reduced interprocessor–communication architecture and its implementation on EM–4", Parallel Computer, Elsevier Science B.V. pp. 754–769, Jan. 1994.

Manu Gulati et al., "Performance Study of a Multithreaded Superscalar Microprocessor", IEEE, pp. 291–301, 1996.

Douglas Donalson et al., "DISC: Dynamic Instruction Stream Computer An Evalutaion of Performance" IEEE, pp. 448–456, 1993.

Bernard Karl Gunther, "Superscalar Performance in a Multithreaded Microprocessor", University of Tasmania Hobart, Chapters 2 and 3, Dec. 1993.

(List continued on next page.)

*Primary Examiner*—Thomas C. Lee
*Assistant Examiner*—Albert Wang
*Attorney, Agent, or Firm*—Karuna Ojanen; Birch, Stewart, Kolasch & Birch

[57] ABSTRACT

The data processing system includes a plurality of execution units forming a plurality of processing pipelines. The plurality of processing pipelines process instructions and include a storage pipeline. The data processing system further includes an instruction unit and a storage control unit. The instruction unit outputs instructions to the plurality of execution units, and controls execution of multiple threads by the plurality of execution units. If an instruction for a first thread in the storage pipeline experiences a cache miss and the instruction unit decides to switch threads, the instruction unit begins processing a second thread. The instruction unit also issues a data request to the storage control unit to obtain the missing data. During processing of the second thread, unused slots will appear in the storage pipeline because it is not possible to always dispatch instructions to completely keep the pipelines filled. After the requested data returns from higher level memory, the storage control unit will dispatch the instruction from the first thread having received the cache miss to an unused slot in the storage pipeline. Consequently, this instruction from the first thread will be processed along with the instructions from the second thread.

19 Claims, 13 Drawing Sheets

U.S. PATENT DOCUMENTS

| | | | |
|---|---|---|---|
| 5,361,337 | 11/1994 | Okin | 712/228 |
| 5,404,469 | 4/1995 | Chung et al. | 712/215 |
| 5,430,850 | 7/1995 | Papadopoulos et al. | 709/303 |
| 5,471,593 | 11/1995 | Branigin | 712/235 |

FOREIGN PATENT DOCUMENTS

| | | | |
|---|---|---|---|
| 4283849 | 10/1992 | Japan | G06F 15/16 |
| 5108348 | 4/1993 | Japan | G06F 9/38 |
| 5151064 | 6/1993 | Japan | G06F 12/02 |
| 5298097 | 11/1993 | Japan | G06F 9/38 |
| 5324471 | 12/1993 | Japan | G06F 12/08 |
| 0659978 | 3/1994 | Japan | G06F 12/08 |

OTHER PUBLICATIONS

Bradley J. Kish and Bruno R. Preiss, "Hobbes: A Multi-Threaded Superscalar Architecture", University of Waterloo, 1994.

Mike Johnson, "Superscalar Microprocessor Design", Prentice Hall, pp. 21, 46–47, 233–235, 268–272, 1991.

Howe's Free On–line Dictionary of Computing (http://www.instantweb.com/~foldoc/), background, foreground, Oct. 1994.

Song, Peter; Microprocessor Report, vol. 11, No. 9, pp. 13–18, "Multithreading Comes of Age".

Israel, Paul et al., 1995 Electronic Engineering Times (Jun. 19), pp. 78–80, "Chip set Aims to Speed Secondary Cache—Parallelism Enhances Level 2 Cache Runs".

Jouppi, Norman P., 17th Annual International Symposium on Computer Architecture (May 28–31, 1990), pp. 364–373, "Improving Direct–Mapped Cache Performance by the Addition of a Small Fully–Associative Cache and Prefetch Buffers".

Stiliadis, Dimitrios et al, IEEE Proceedings of the 27th Annual Hawaii International Conference on System Sciences (1994), pp. 412–421, "Selective Victim Caching: A Method to Improve the Performance of Direct–Mapped Caches".

Stiliadis, Dimitrios et al, IEEE Transactions on Computers, vol. 46, No. 5 (May 1997), pp. 603–610, "Selective Victim Caching: A Method to Improve the Performance of Direct–Mapped Caches".

Wilson, Ron, Jul. 1, 1989 Computer Design, pp. 72–83, "Higher Speeds Push Embedded Systems to Multiprocessing".

Sporer, Michael et al, 33rd IEEE Computer Society International Conference, Feb. 29–Mar. 4, 1988 Spring Compcon, pp. 464–467, "An Introduction to the Architecture of the Stellar Graphics Supercomputer".

Lorin, Harold, John Wiley & Sons Publication, pp. 41–53, "Introduction to Computer Architecture and Organization".

Chang, Yen et al, Electronic Technology for Engineers and Engineering Managers, vol. 32, No. 8, Apr. 15, 1987, pp. 177–184, "Use Structured Arrays for High–Performance Data Processing".

Agarwal, Anant et al, IEEE Micro, vol. 13, No. 3, pp. 48–61, "Sparcle: An Evolutionary Processor Design for Large–Scale Multiprocessors".

Laudon, James et al, Sixth International Conference on Architectural Support for Programming Languages and Operating Systems, San Jose, Oct. 4–7, 1994, "Interleaving: A Multithreading Technique Targeting Multiprocessors and Workstations".

Borkenhagen, John et al, Proceedings of IEEE International Conference on Computer Design: VLSI in Computers and Processors, Oct. 10–12, 1994, pp. 192–196, "AS/400 64–Bit PowerPC–Compatible Processor Implementation".

IBM Patent Application, Docket RO996–129, Filed Dec. 9, 1996, Serial No. 08/761,378, "Multi–Entry Fully Associative Transition Cache".

IBM Patent Application, Docket RO996–144, Filed Dec. 9, 1996, Serial No. 08/761,380, "Method and Apparatus for Prioritizing and Routing Commands from a Command Source to a Command Sink".

IBM Patent Application, Docket RO996–145, Filed Dec. 9, 1996, Serial No. 08/761,379, "Method and Apparatus for Tracking Processing of a Command".

"Sparcle: An Evolutionary Processor Design for Large–Scale Multiprocessors," IEEE Micro, Agarwal et al., Jun. 1993, pp. 48–61.

"AS/400™ 64–bit PowerPC™–Compatible Processor Implementation" Borkenhagen et al., Proceedings 1994 IEEE Int'l Conf. on Computer Design: VLSI in Computers and Processors, Oct. 10–12, 1994, pp. 192–196.

"Interleaving: A Multithreading Technique Targeting Multiprocessors and Workstations," presented at the Sixth Int'l Conf. on Architectural Support for Programming Languages and Operating Systems, Laudon et al., pp. 308–318, Oct. 1994.

| Cycle 1 | | | |
|---|---|---|---|
| A0 | B0 | C0 | D0 |
| | | | |
| | | | |

| Cycle 2 | | | |
|---|---|---|---|
| E0 | F0 | G0 | H0 |
| A0 | B0 | C0 | D0 |
| | | | |

| Cycle 3 | | | |
|---|---|---|---|
| I0 | J0 | K0 | L0 |
| E0 | F0 | G0 | H0 |
| A0 | B0 | C0 | D0 |

A0 Cache Miss

| Cycle 4 | | | |
|---|---|---|---|
| I0 | J0 | K0 | L0 |
| E0 | F0 | G0 | H0 |
| A0 | B0 | C0 | D0 |

Stall

| Cycle 5 | | | |
|---|---|---|---|
| I0 | J0 | K0 | L0 |
| E0 | F0 | G0 | H0 |
| A0 | B0 | C0 | D0 |

Stall

| Cycle 6 | | | |
|---|---|---|---|
| I0 | J0 | K0 | L0 |
| E0 | F0 | G0 | H0 |
| A0 | B0 | C0 | D0 |

Stall
A0 Data Returning

| Cycle 7 | | | |
|---|---|---|---|
| I0 | J0 | K0 | L0 |
| E0 | F0 | G0 | H0 |
| A0 | B0 | C0 | D0 |

A0 Data Returns

| Cycle 8 | | | |
|---|---|---|---|
| I0 | J0 | K0 | L0 |
| E0 | F0 | G0 | H0 |
| A0 | B0 | C0 | D0 |

Commit A0

| Cycle 9 | | | |
|---|---|---|---|
| M0 | N0 | O0 | P0 |
| I0 | J0 | K0 | L0 |
| E0 | F0 | G0 | H0 |

| Cycle 10 | | | |
|---|---|---|---|
| Q0 | R0 | S0 | T0 |
| M0 | N0 | O0 | P0 |
| I0 | J0 | K0 | L0 |

Cycle 1

| A0 | B0 | C0 | D0 |
|----|----|----|----|
|    |    |    |    |
|    |    |    |    |

Cycle 2

| E0 | F0 | G0 | H0 |
|----|----|----|----|
| A0 | B0 | C0 | D0 |
|    |    |    |    |

Cycle 3

| I0 | J0 | K0 | L0 |
|----|----|----|----|
| E0 | F0 | G0 | H0 |
| A0 | B0 | C0 | D0 |

A0 Cache Miss

Cycle 4

| A1 | B1 | C1 | D1 |
|----|----|----|----|
|    |    |    |    |
|    |    |    |    |

Thread 1 Dispatched

Cycle 5

| E1 | F1 | G1 | H1 |
|----|----|----|----|
| A1 | B1 | C1 | D1 |
|    |    |    |    |

Cycle 6

| J1 | K1 | L1 |    |
|----|----|----|----|
| E1 | F1 | G1 | H1 |
| A1 | B1 | C1 | D1 |

A0 Data Returning

Cycle 7

| M1 | N1 | O1 | P1 |
|----|----|----|----|
|    | J1 | K1 | L1 |
| E1 | F1 | G1 | H1 |

A0 Data Returns

Cycle 8

| Q1 | R1 | S1 | T1 |
|----|----|----|----|
| M1 | N1 | O1 | P1 |
|    | J1 | K1 | L1 |

Cycle 9

| U1 | V1 | W1 | X1 |
|----|----|----|----|
| Q1 | R1 | S1 | T1 |
| M1 | N1 | O1 | P1 |

M1 Cache Miss

Cycle 10

| A0 | B0 | C0 | D0 |
|----|----|----|----|
|    |    |    |    |
|    |    |    |    |

Thread 0 Dispatched

Cycle 11

| E0 | F0 | G0 | H0 |
|----|----|----|----|
| A0 | B0 | C0 | D0 |
|    |    |    |    |

FIGURE 11

Cycle 1

| A0 | B0 | C0 | D0 |
|----|----|----|----|
|    |    |    |    |
|    |    |    |    |

Cycle 2

| E0 | F0 | G0 | H0 |
| A0 | B0 | C0 | D0 |
|    |    |    |    |

Cycle 3

| I0 | J0 | K0 | L0 |
| E0 | F0 | G0 | H0 |
| A0 | B0 | C0 | D0 |

A0 Cache Miss

Cycle 4

| A1 | B1 | C1 | D1 |
|    |    |    |    |
|    |    |    |    |

Thread 1 Dispatched

Cycle 5

| E1 | F1 | G1 | H1 |
| A1 | B1 | C1 | D1 |
|    |    |    |    |

Cycle 6

| a0 | J1 | K1 | L1 |
| E1 | F1 | G1 | H1 |
| A1 | B1 | C1 | D1 |

A0 Data Returning

Cycle 7

| M1 | N1 | O1 | P1 |
| a0 | J1 | K1 | L1 |
| E1 | F1 | G1 | H1 |

A0 Data Returns

Cycle 8

| Q1 | R1 | S1 | T1 |
| M1 | N1 | O1 | P1 |
| a0 | J1 | K1 | L1 |

Cycle 9

| U1 | V1 | W1 | X1 |
| Q1 | R1 | S1 | T1 |
| M1 | N1 | O1 | P1 |

M1 Cache Miss

Cycle 10

| E0 | F0 | G0 | H0 |
|    |    |    |    |
|    |    |    |    |

Thread 0 Dispatched

Cycle 11

| I0 | J0 | K0 | L0 |
| E0 | F0 | G0 | H0 |
|    |    |    |    |

BACKGROUND COMPLETION OF INSTRUCTION AND ASSOCIATED FETCH REQUEST IN A MULTITHREAD PROCESSOR

RELATED APPLICATION DATA

This present invention relates to the following U.S. applications, the subject matter of which is hereby incorporated by reference: (1) U.S. application Ser. No. 08/761,378, now U.S. Pat. No. 6,000,011, entitled MULTI-ENTRY FULLY ASSOCIATIVE TRANSITION CACHE, filed on Dec. 9, 1996, by Donald L. FREERKSEN, Farnaz MOUNES-TOUSSI, Peder J. PAULSON, John D. IRISH, and Lyle E. GROSBACH; (2) U.S. application Ser. No. 08/761,380, now U.S. Pat. No. 6,000,012, entitled METHOD AND APPARATUS FOR PRIORITIZING AND ROUTING COMMANDS FROM A COMMAND SOURCE TO A COMMAND SINK, filed Dec. 9, 1996, by Donald L. FREERKSEN and Peder J. PAULSON; and (3) U.S. application Ser. No. 08/761,379, now U.S. Pat. No. 6,035,424 entitled METHOD AND APPARATUS FOR TRACKING PROCESSING OF A COMMAND, filed on Dec. 9, 1996, by Donald L. FREERKSEN and Peder J. PAULSON.

BACKGROUND OF THE INVENTION

The present invention relates to a multithread data processing system and method which completes processing an instruction and associated fetch request for a first thread while executing instructions of a second thread to increase processing efficiency upon a thread-switch back to the first thread.

Today the most common architecture for high performance, single-chip microprocessors is the RISC, for reduced instruction set computer, architecture. As semiconductor technology has advanced, the goal of RISC architecture has been to develop processor designs that can come close to initiating one instruction on each clock cycle of the machine. This measure, clock cycles per instruction or CPI, is commonly used to characterize architectures for high performance processors. The architectural features of instruction pipelining and cache memories have made the CPI improvements possible. Pipeline instruction execution allows subsequent instructions to begin execution before previously issued instructions have finished execution. Cache memories allow instruction execution to continue, in most cases, without waiting the full access time of a main memory.

Instruction pipelining involves processing an instruction in several stages. Each stage typically takes one clock cycle. While the number of stages can differ depending upon the RISC architecture, typical pipelining includes an instruction fetch stage wherein the instruction is obtained. Superscalar architectures, discussed in more detail below, also include a subsequent dispatch/general purpose register access stage wherein the instruction is decoded and dispatched to the correct pipeline. In discussing both pipeline and superscalar architectures in the present disclosure, these two preliminary stages will be ignored to simplify the description; however, it is to be understood that these two stages are performed in such architectures.

After the preliminary stages of instruction fetch and dispatch/general purpose register access, the next stage, illustrated as stage 1 in FIG. 1 is the address stage. During the address stage, the processor fetches operands from registers for register-to-register scalar operations, e.g., arithmetic and logical operations, or generates virtual addresses for performing a load/store instruction. In the data or second stage, stage 2, register-to-register scalar operations are completed, or the data cache, D-cache, is accessed for load/store instructions using the generated virtual address. The third stage, stage 3, is a commit stage wherein the result of the scalar operation or the data obtained from a load instruction are stored in the destination register.

FIG. 1 illustrates the life of an instruction "A" in a 3-stage pipeline. To gain a performance advantage from pipelining, multiple instructions are executed simultaneously in different stages of the pipeline.

FIG. 2 shows the execution of instructions A, B, and C in the pipeline of FIG. 1. If executed serially without pipelining, instructions A, B, and C would take nine cycles to execute. With pipelining, however, the instructions take only five cycles to execute.

The performance of a conventional RISC processor can be further increased by adopting a superscalar architecture. In a superscalar architecture, multiple functional or execution units are provided to run multiple pipelines in parallel.

FIG. 3 illustrates the pipelines for an exemplary pipelined, 4-way superscalar architecture. A unique pipeline is provided for load/store operations, arithmetic operations, logical operations, and branching operations. Branch execution is done somewhat independently of the other pipelines, but branches move through the branch pipeline like other instructions to maintain instruction order of a branch with respect to other instructions. Execution of a branch involves branch target address generation, condition code checking in the case of a conditional branch, fetching of instructions at the branch target address, cancelling execution/commitment of all instructions in the pipeline that come after a taken branch in program order, and changing the program counter for a taken branch. These stages are generally performed in stages 1–3 as illustrated in FIG. 3 and the two preliminary stages, instruction fetch and dispatch/general purpose register access, discussed above.

In a superscalar architecture, only one instruction can be dispatched to a pipeline at a time, and dependencies between instructions may inhibit dispatch or stall the pipeline. The example shown in FIG. 3 shows instructions A–I being executed. Execution of these instructions would take a minimum of 27 cycles in a non-pipelined, non-superscalar processor, and a minimum 11 cycles in a pipelined non-superscalar processor. In the pipelined, 4-way superscalar processor, however, instruction execution of instructions A–I only takes five cycles.

In this pipelined, superscalar architecture, instructions may be completed in-order and out-of-order. In-order completion means no instruction can complete before all instructions dispatched ahead of it have been completed. Out-of-order completion means that an instruction may be completed before all instructions ahead of it have been completed, as long as a predefined set of rules are satisfied. For both in-order and out-of-order execution in pipelined, superscalar systems, there are conditions that will cause pipelines to stall. An instruction that is dependent upon the results of a previously dispatched instruction which has not been completed can cause the pipeline to stall.

For instance, instructions dependent on a load/store instruction, e.g., a fetch request, which experiences a cache miss will stall until the miss is resolved, i.e., a cache hit. Keeping a high hit ratio in, for example, the data cache is not trivial, especially for computations involving large data structures. A cache miss can cause the pipelines to stall for several cycles, and the amount of memory latency will be severe if the miss ratio is high.

Although memory devices used for main memory are becoming faster, the speed gap between such memory chips and high-end processors is becoming increasingly larger. Accordingly, a significant amount of execution time in current high-end processor designs is spent waiting for cache misses, and it is expected that memory access delays will make up an increasing proportion of processor execution time unless memory latency tolerance techniques are implemented.

One known technique for tolerating memory latency is hardware multithreading. In general, hardware multithreading employs a processor that maintains the state of several tasks or threads on-chip. This generally involves replicating the processor registers for each thread.

For instance, for a processor implementing the RISC architecture, sold under the trade name PowerPC™ by the assignee of the present application, to perform multithreading, the processor must maintain N states to run N threads. Accordingly, the following are replicated N times: general purpose registers or GPRs, floating point registers or FPRs, condition register or CR, floating point status and control register or FPSCR, count register, link register or LR, exception register or XER, save restore registers 0 and 1 or SRR0 and SRR1, and some of the special purpose registers or SPRs. Additionally, the segment look aside buffer or SLB, can be replicated or, alternatively, each entry can be tagged with the thread number. If not replicated or tagged, the SLB must be flushed on every thread switch. Also, some branch prediction mechanisms should be replicated, e.g., the correlation register and the return stack. Fortunately, there is no need to replicate some of the larger functions of the processor such as: level one instruction cache or L1 I-cache, level one data cache or L1 D-cache, instruction buffer, store queue, instruction dispatcher, functional or execution units, pipelines, translation look aside buffer or TLB, and branch history table. When one thread encounters a delay, the processor rapidly switches to another thread. The execution of this thread overlaps with the memory delay on the first thread.

Two types of multithreading exist: hardware multithreading and software multithreading. There are two basic forms of hardware multithreading. A traditional form is to keep N threads, or states, in the processor and interleave the threads on a cycle-by-cycle basis. This eliminates all pipeline dependencies because instructions in a single thread are separated. The other form of hardware multithreading is to switch the threads on some long-latency event. A preferred embodiment of the present invention employs hardware multithreading and switches between threads on some long-latency event.

Multithreading permits the pipeline(s) to be used for useful work for a separate thread when a pipeline stall condition is detected for the current thread. Multithreading is described with respect to FIGS. 4 and 5, with FIG. 4 showing what happens when there is no multithreading. FIG. 4 illustrates the processing performed by a pipelined, 4-way superscalar architecture when a cache miss occurs for an instruction in the storage pipeline. Assume that instructions dispatched after instruction D0 have a data dependency upon instruction A0. Instruction A0 is a storage instruction which has a cache miss that takes five cycles to resolve. Accordingly, without multithreading, the pipelines stall until the cache miss is resolved for A0. Consequently, when the cache miss for instruction A0 occurs in cycle 3, the processor stalls for cycles 4–7 until the data for instruction A0 returns in cycle 7 and is committed in cycle 8. Processing of instructions then continues as shown in cycles 9 and 10.

By contrast, hardware multithreading permits the processor to remain active even when a cache miss is encountered in a first thread. As shown in FIG. 5, in cycle 3 instruction A0 has a cache miss the same as shown in FIG. 4. FIG. 5, however, represents multithread processing; and consequently, in cycle 4 the instructions of thread 0 are squashed from the pipelines, and the instructions for thread 1 are dispatched to the pipelines. The processor processes thread 1 during cycles 4, 5, 6 and 7. Note that in a non-multithread architecture, the processor would merely stall during these cycles. Switching threads can take a cycle or more, but for ease of illustration this switching time has not been accounted for in the figures of the present invention.

The processor will continue to process thread 1 until a thread switch back to thread 0 occurs. For purposes of discussion, a thread switch back to thread 0 is assumed to occur because instruction M1 experiences a cache miss. As one skilled in the art knows, however, several thread switching techniques exist. For example, one possible thread switching method can be reviewed in "Sparcle: An Evolutionary Design for Large-Scale Multiprocessors," by Agarwal et al., IEEE Micro Volume 13, No. 3, pps. 48–60, June 1993.

Because instruction M1 experiences a cache miss, the thread 1 instructions are squashed from the pipelines and instructions A0, B0, C0 and D0 for thread 0 are dispatched in cycle 10. As discussed above, the instructions following instruction D0 are dependent upon the completion of instruction A0. Processing of instructions for thread 0 then continues as shown in cycle 11. In subsequent cycles, instruction A0 experiences a cache hit because the data for instruction A0 was loaded into the data cache. Accordingly, the processor continues execution of the instructions in thread 0.

Unfortunately, in the multithread architecture of the conventional data processing system, an instruction of a first thread receiving a cache miss must wait for the first thread to become the active or foreground thread before being processed through the pipeline. For example, the Agarwal et al. article cited above discloses such a system. Consequently, this architecture requires a completing cycle before processing instructions dependent upon the instruction receiving a cache miss.

OBJECTS AND SUMMARY OF THE INVENTION

It is an object of the present invention to provide a data processing system and method which completes processing an instruction and associated fetch request for a first thread while executing instructions of a second thread to increase processing efficiency upon a thread-switch back to the first thread.

A further object of the present invention is to provide a multithread, superscalar architecture capable of completing an instruction of a first thread having received a cache miss in the background during the processing of a second thread.

Another object of the present invention is to provide a multithread data processing system and method having an improved CPI.

The objects of the present invention are achieved by providing a data processing system and method which executes at least a first and second thread. During execution of the second thread, the data processing system will complete a data fetch request associated with an instruction of the first thread. After completing the data fetch request, the data processing system will process the instruction of the first thread, associated with the data fetch request, along with the instructions of the second thread. Consequently, the data processing system more efficiently processes the first thread because the instruction of the first thread completed along with the instructions of the second thread will not have to be processed upon a thread switch back to the first thread.

More specifically, the data processing system and method include a plurality of execution units forming a plurality of processing pipelines. The plurality of processing pipelines process instructions and include a storage pipeline. The data processing system further includes an instruction unit and a storage control unit. The instruction unit outputs instructions to the plurality of execution units, and controls execution of multiple threads by the plurality of execution units. When a cache miss occurs, the instruction unit issues a data request to the storage control unit to obtain the missing data.

If an instruction for a first thread in the storage pipeline experiences a cache miss and the instruction unit decides to switch threads, the instruction unit begins processing a second thread. Meanwhile, in accordance with a data fetch task sent from the instruction unit, the storage control unit requests the missing data from high level memory. During processing of the second thread, however, unused slots will appear in the storage pipeline because it is not possible to always dispatch instructions to completely keep the pipelines filled. After the requested data returns from higher level memory, the storage control unit routes the instruction from the first thread having received the cache miss to an unused slot in the storage pipeline. This instruction from the first thread will be processed along with the instructions from the second thread. Because the second thread is the thread currently dispatched to the pipelines, the instructions of the second thread are considered the foreground instructions. The instruction of the first thread processed along with the foreground instructions is considered a background instruction. In this manner, the instruction of the first thread having received the cache miss can be processed in the background such that upon a thread switch back to the first thread, the instruction of the first thread having received the cache miss does not need to be dispatched to the pipeline. Instead, instructions dependent thereon can be immediately dispatched to the pipeline; thus, saving a complete processing cycle over conventional architectures.

Other objects, features and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 illustrates the processing of instructions in the pipelines of a pipelined, 4-way superscalar architecture when a cache miss occurs;

FIG. 5 illustrates the processing of instructions in the pipelines of a pipelined, multithread, 4-way superscalar architecture;

FIG. 11 illustrates the processing of instructions through the pipelines of the pipelined, multithread, superscalar architecture according to the present invention.

DETAILED DESCRIPTION OF THE PREFERRED EMBODIMENTS

Figure 6A:
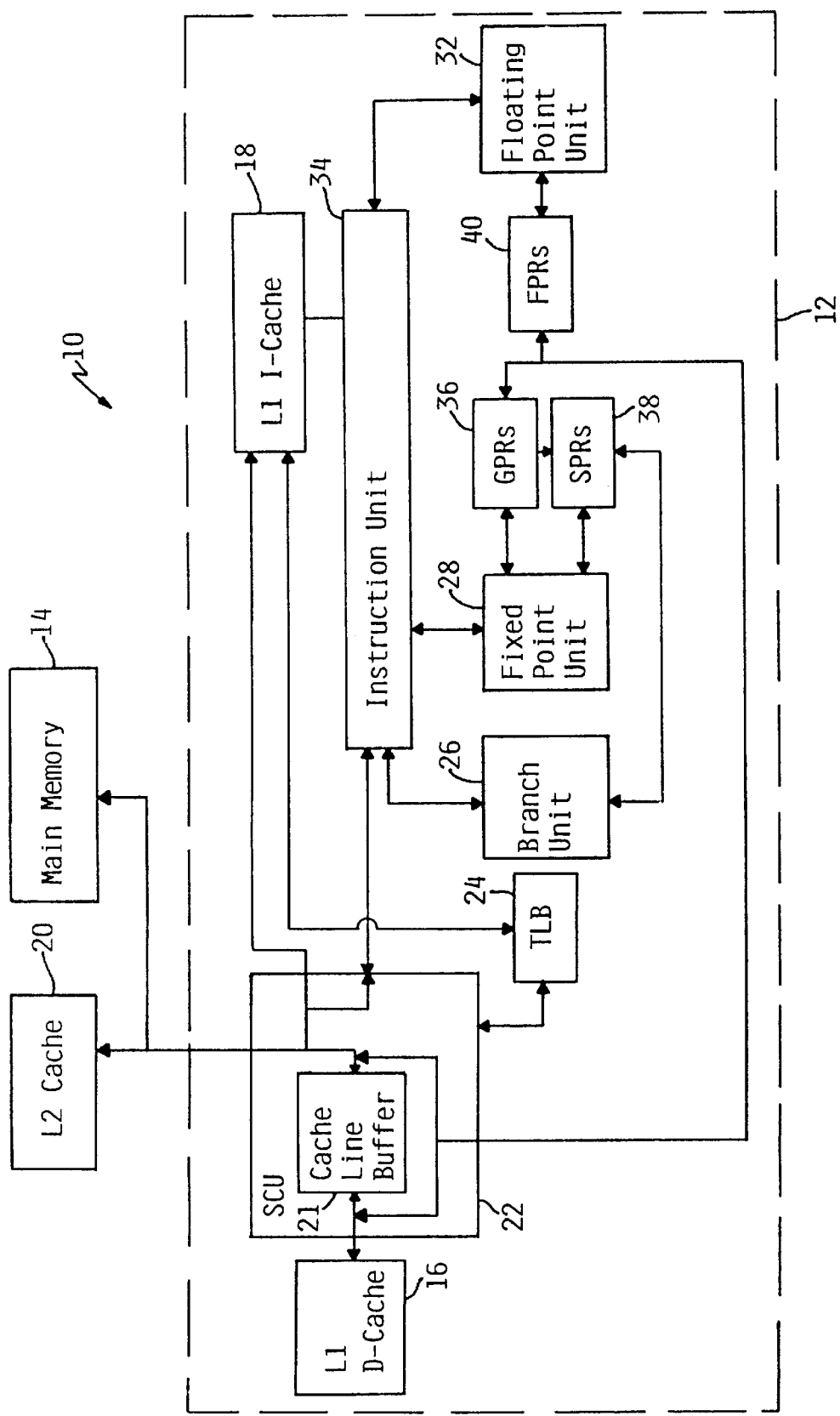
FIG. 6A illustrates a high level block diagram of the data processing system according to the present invention.

With reference now to the figures and in particular with reference to FIG. 6A, there is depicted a high level block diagram of a data processing system 10 which may be utilized to implement the method and system of the present invention. In a preferred embodiment, the processor 12 of the system 10 is a single integrated circuit, pipelined, superscalar microprocessor, which may be implemented utilizing any computer architecture such as the family of RISC processors sold under the trade name PowerPC™; for example, the PowerpC™ 604 microprocessor chip sold by International Business Machines Corporation.

As will be discussed below, the data processing system 10 includes various units, registers, buffers, memories, and other sections as provided, for example, in a PowerPC™ RISC processor, which are all preferably formed by integrated circuitry. It should be understood that in FIG. 6A, and in the later described FIG. 6B, the various data paths have been presented in a greatly simplified form for clarity. As is appreciated by one skilled in the art, many separate data paths into and out of the various components are required. Additionally, certain components, and many data and control lines have been omitted entirely from FIGS. 6A and 6B for clarity. The data processing system 10 can operate according to RISC techniques or other well-known computing techniques as would occur to one skilled in the art.

Initially, the various units, registers, buffers, memories, etc. and their interconnections illustrated in FIGS. 6A and 6B will be described. Then, the operation of the data processing system illustrated in FIGS. 6A–6B will be described with reference to FIGS. 7–11.

STRUCTURE OF THE PRESENT INVENTION

As illustrated in FIG. 6A, the data processing system 10 preferably includes a main memory 14, a level two or L2 cache 20, a level one data cache or L1 D-cache 16, and a level one instruction cache or L1 I-cache 18, which are interconnected utilizing various bus connections and a storage control unit or SCU 22. As shown in FIG. 6A, the SCU 22 includes a cache line buffer 21 for connecting the L1 D-cache 16 to the L2 cache 20, the main memory 14, and a plurality of execution units as will be later described.

Preferably, the cache line buffer 21 is the transition cache of U.S. application Ser. No. 08/761,378, now U.S. Pat. No. 6,000,011, entitled MULTI-ENTRY FULLY ASSOCIATIVE TRANSITION CACHE by Don FREERKSEN, Farnaz MOUNES-TOUSSI, Peder J. PAULSON, John D. IRISH, and Lyle E. GROSBACH, filed concurrently herewith, and incorporated herein by reference.

The L1 D-cache 16 and L1 I-cache 18 are provided on chip as part of the processor 12, while the main memory 14 and the L2 cache 20 are provided off chip. The L2 cache 20 is preferably a higher speed memory system than the main memory 14, and by storing selected data within the L2 cache 20, in accordance with various well known techniques, the memory latency which occurs as a result of a reference to the main memory 14 can be minimized. As shown in FIG. 6A, the L2 cache 20 and the main memory 14 are directly connected to both the L1 I-cache 18 and an instruction unit 34 via the SCU 22. This is described in greater detail with reference to FIG. 6B.

Instructions from the L1 I-cache 18 are preferably output to an instruction unit 34 which controls the execution of multiple threads by the various execution units within the data processing system 10. The various execution units within the data processing system 10 include at least a branch unit 26, a fixed point unit 28, the SCU 22, and a floating point unit 32. Further, the instruction unit 34, in a preferred embodiment, employs any well known technique to minimize so-called "thrashing," i.e., a plurality of consecutive thread switches.

In addition to the various execution units depicted within FIG. 6A, those skilled in the art will appreciate that modern superscalar microprocessor systems often include multiple versions of each such execution unit. Other execution units may be added without departing from the spirit and scope of the present invention. Most of these units will have as an input source operand information from various registers such as general purpose registers or GPRs 36, and floating point registers or FPRs 40. Additionally, multiple special purpose register or SPRs 38 may be utilized in accordance with the method and system of the present invention to store processor state information in response to thread switching. As shown in FIG. 6A, the SCU 22 and the cache line buffer 21 are directly connected to the GPRs 36 and the FPRs 40, while the GPRs 36 are connected to the SPRs 38.

As illustrated in FIG. 6A, a bus is provided between the SCU 22 and the instruction unit 34 for communication therebetween. For instance, over this bus, the instruction unit 34 issues data requests, etc., to the SCU 22, and the SCU 22 can, for example, inform the instruction unit 34 of a miss within the L2 cache 20. Further, a so-called "Translation Lookaside Buffer" or TLB 24 is provided which contains virtual-to-real address mapping. Although not illustrated within the present invention, various additional high level memory mapping buffers may be provided such as a Segment Lookaside Buffer which will operate in a manner similar to the translation lookaside buffer 24.

Figure 6B:
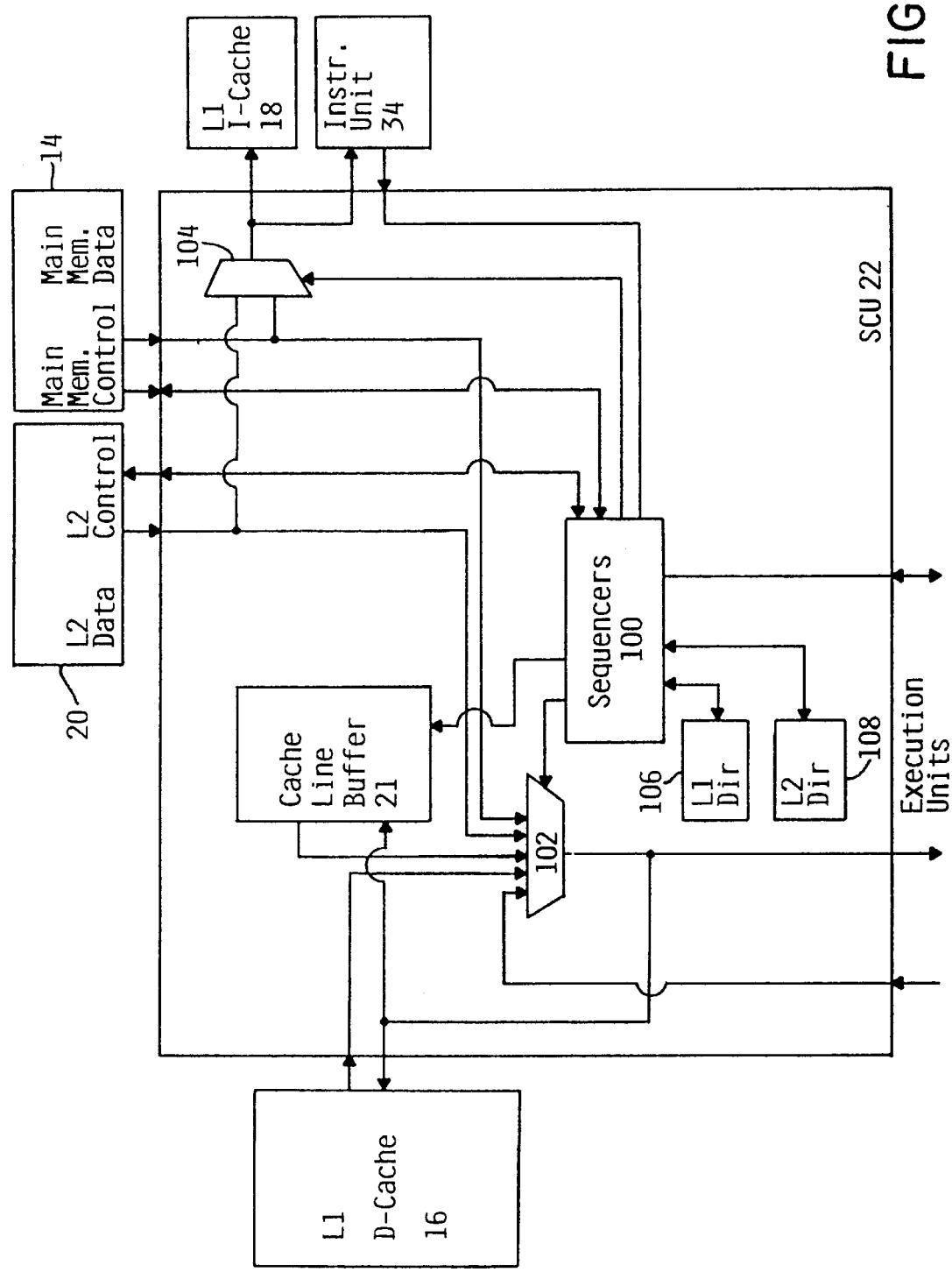
FIG. 6B illustrates the storage control unit of FIG. 6A in greater detail.

FIG. 6B illustrates the SCU 22 in greater detail. As shown in FIG. 6B, the SCU 22 includes the cache line buffer 21 which receives data from a data multiplexer 102. The cache line buffer 21 receives control signals from miss data tracking sequencers 100. As discussed in more detail below, in a preferred embodiment of the present invention, the sequencers 100 include three sequencers for handling and tracking instruction and/or data fetch requests, and are implemented as combinatorial logic.

As shown in FIG. 6B, the data multiplexer 102 receives data from the L1 D-cache 16, the cache line buffer 21, the execution units, the L2 cache 20, and the main memory 14. The data from one of these data sources is output by the data multiplexer 102 in response to a selection signal received from the sequencers 100. The sequencers 100 output control signals to the data multiplexer 102, the cache line buffer 21, and the L2 cache 20. The sequencers 100 also receive and output control signals to and from the main memory 14. The output of the data multiplexer 102 is supplied to the L1 D-cache 16, the execution units, and the cache line buffer 21. For the sake of clarity, the connections between the cache line buffer 21, the L2 cache 20 and the main memory 14 have not been shown.

Furthermore, as shown in FIG. 6B, the sequencers 100 output a selection signal to an instruction multiplexer 104 which receives data from the L2 cache 20 and the main memory 14. Based on the selection signal from the sequencers 100, the instruction multiplexer 104 outputs the data from one of these sources to both the L1 I-cache 18 and the instruction unit 34. In producing the above-discussed control and selection signals, the sequencers 100 access and update the L1 directory 106 for the L1 D-cache 16 and the L2 directory 108 for the L2 cache 20. The access and updating of the L1 directory 106 and the L2 directory 108 is performed according to well known techniques. The operation of the SCU 22 illustrated in FIG. 6B is discussed in detail below.

PIPELINE STRUCTURE OF THE PRESENT INVENTION

Figure 7:
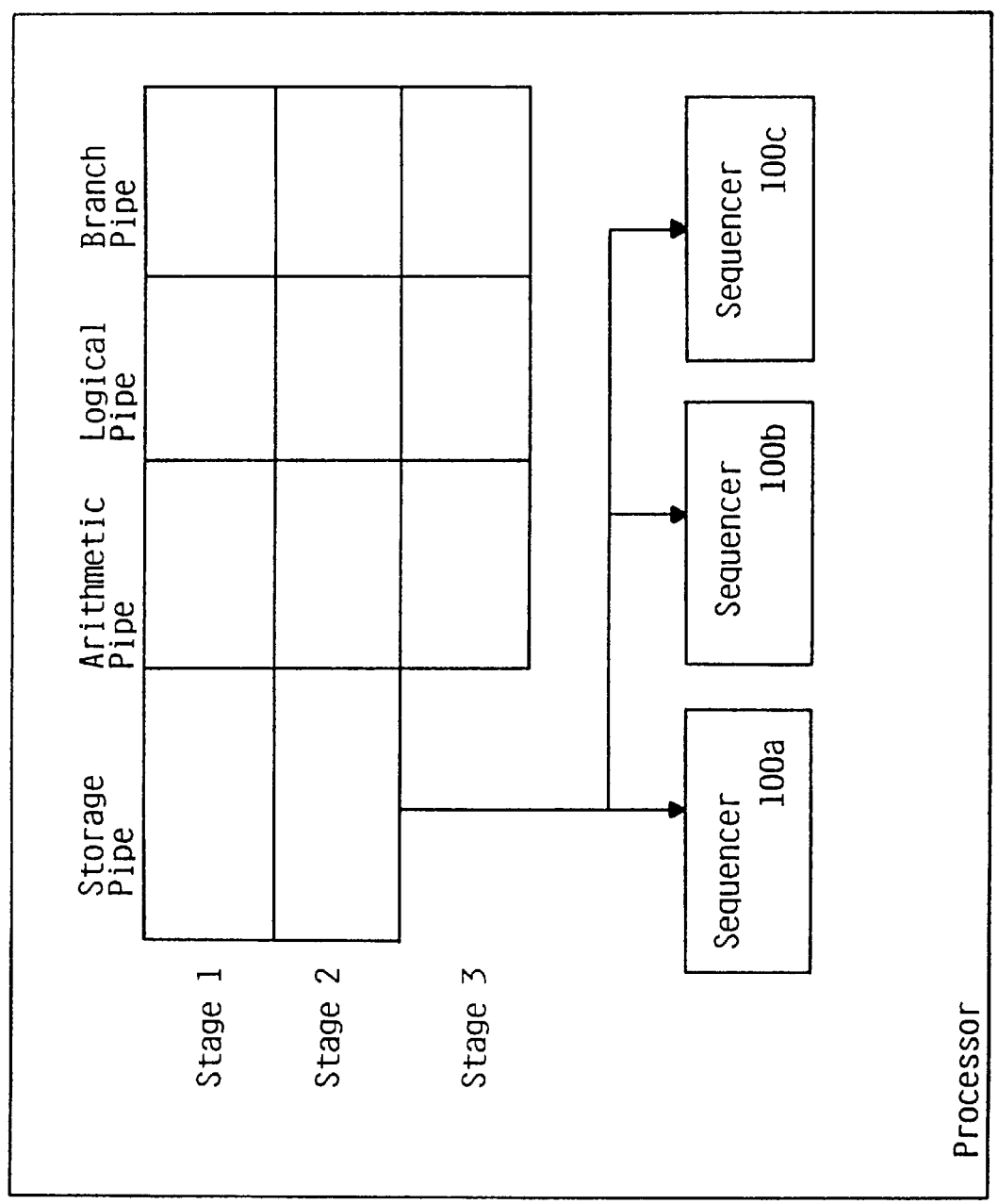
FIG. 7 illustrates the pipeline flow diagram for the processor according to the present invention.

Next, the pipeline structure implemented by the processor 12 will be discussed with reference to FIG. 7. The pipeline structure includes four pipelines: a storage pipeline, an arithmetic pipeline, a logical pipeline, and a branch pipeline. These pipelines include the same stages as discussed in the Background of the Invention section with respect to FIG. 3. It should be understood, however, that the present invention is not restricted to a four pipeline architecture, but could be greater or less than a four pipeline structure. Furthermore, the types of pipelines can be duplicated without departing from the spirit and scope of the present invention.

Figure 1:
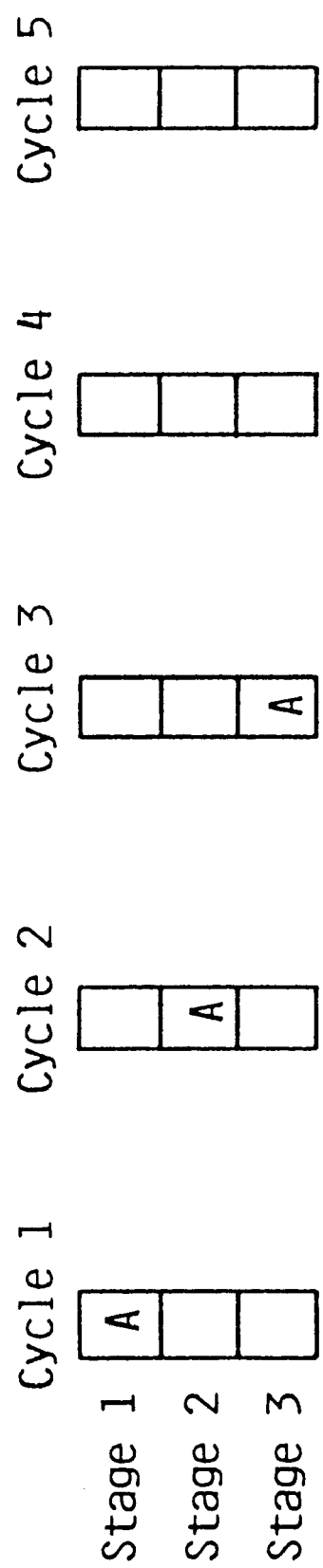
FIG. 1 illustrates the processing of an instruction in a pipeline.
Figure 2:
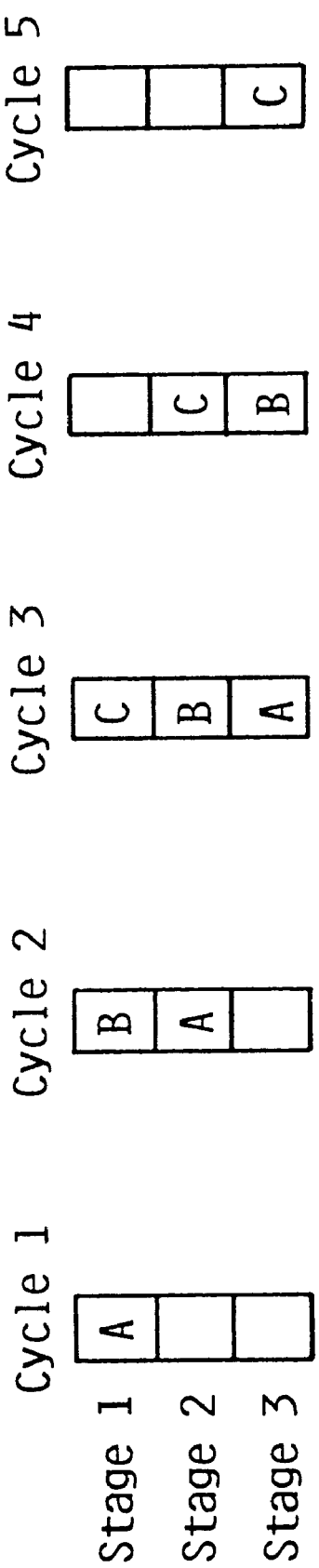
FIG. 2 illustrates the processing of several instructions in a pipeline.
Figure 3:
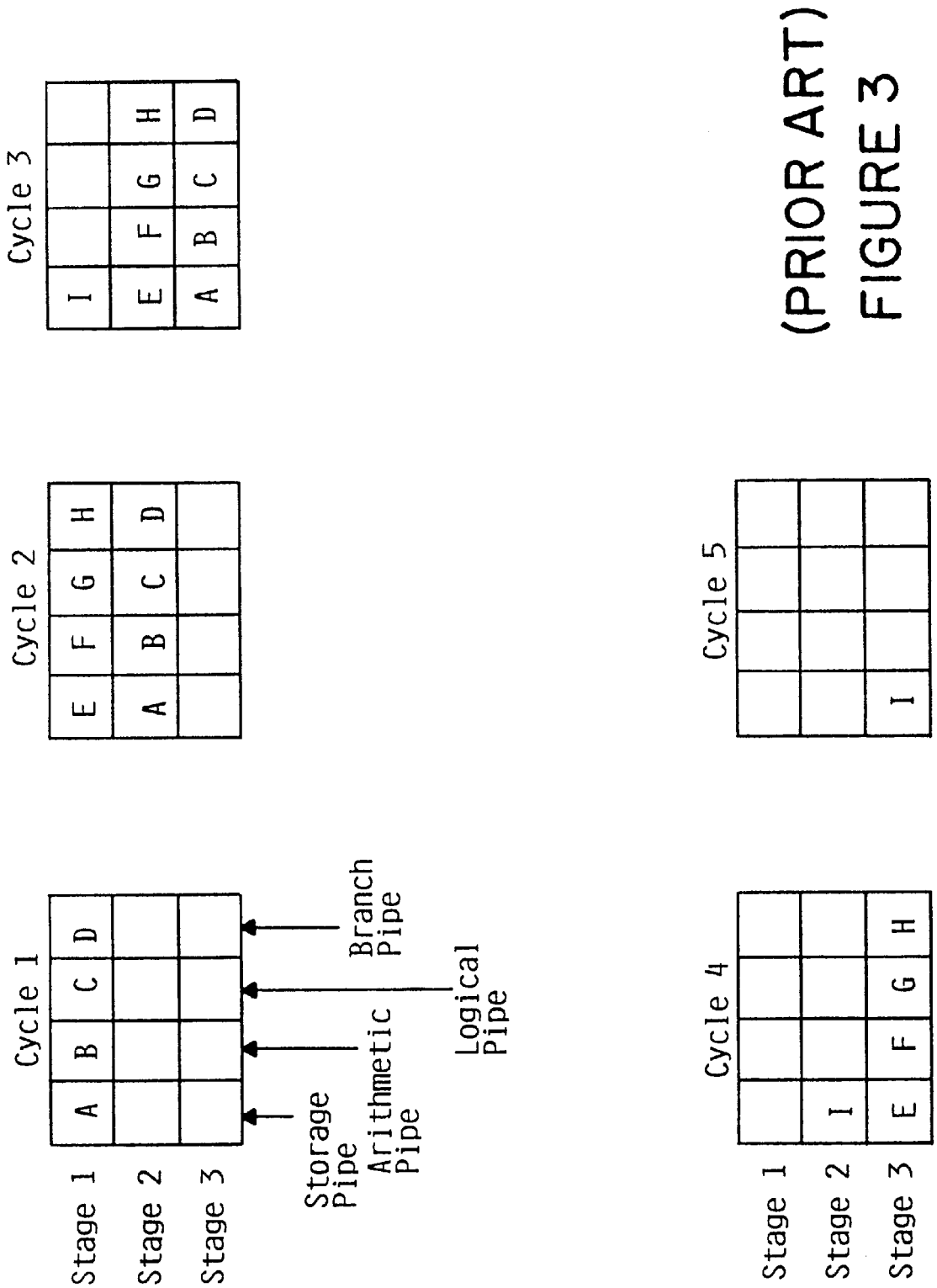
FIG. 3 illustrates the processing of instructions in the pipelines of a pipelined, 4-way superscalar architecture.

While the pipeline structure has been illustrated as having the three stages described with respect to FIGS. 1–3, it should be understood that the preliminary stages of instruction decode and dispatch/general purpose register access are also performed. Additionally, the number of stages is not limited to those disclosed, but could be increased or decreased as would occur to the ordinarily skilled computer architect.

Even though the pipeline structure includes the same stages as FIGS. 1–3, the structure for stage 3 of the storage pipeline significantly differs from that shown in FIGS. 1–3. As discussed above, the present invention includes three sequencers, which for the purposes of illustration in FIG. 7, have been labelled sequencer 100a, 100b, and 100c. The number of sequencers 100, however, is not limited to three, but can be increased or decreased as desired by the computer architect based on required performance characteristics. The multiple sequencers 100a, 100b, and 100c facilitate processing in both multithread and non-multithread environments. Specifically, the sequencers handle the processing of an L1 I-cache miss, and an L1 D-cache miss.

For instance, during processing of instructions, if the instruction unit 34 experiences an L1 I-cache miss, then the instruction unit supplies an instruction request to the SCU 22. The SCU 22 determines if one of the sequencers 100a, 100b, and 100c in the sequencers 100 is available to handle the request. If available, the available one of sequencers 100 handles the instruction fetch task so that processing can continue. Likewise, if an L1 D-cache miss is experienced, a data request is issued to the SCU 22, and the SCU 22 determines if one of the sequencers 100a, 100b, and 100c in the sequencers 100 is available. If available, the available one of the sequencers 100 handles the L1 D-cache miss.

Because three sequencers are provided, the SCU 22 of the present invention can handle three such requests at one time. By contrast, conventional pipeline structures such as shown in FIG. 3 only provide a single sequencer such that the system must wait for that one sequencer to become available before assigning a new cache miss processing task to the sequencer.

With multiple sequencers 100, processing of instructions for a single thread or multiple threads can continue whenever there is no data dependency for the instruction experiencing the cache miss. Therefore, while sequencer 100a processes an L1 D-cache miss, subsequent instructions, which do not depend upon the requested data, can continue to be processed by the pipelines because two other sequencers, the sequencers 100b and 100c, are available to handle a second cache miss.

OPERATION OF THE PRESENT INVENTION

The operation of the present invention will now be described with respect to FIGS. 6A–11.

Processing Instruction Fetch Requests

When the instruction unit 34 requests an instruction from the L1 I-cache 18 and gets a cache miss, the instruction unit 34 issues an instruction line fill request to the SCU 22. The SCU 22 requests the instruction from the L2 cache 20, and if not stored therein, from the main memory 14. When the SCU 22 detects the return of the requested instruction, the SCU 22 directly outputs the requested instruction to the instruction unit 34 and the I-cache 18 for processing and storage, respectively.

Figure 8:
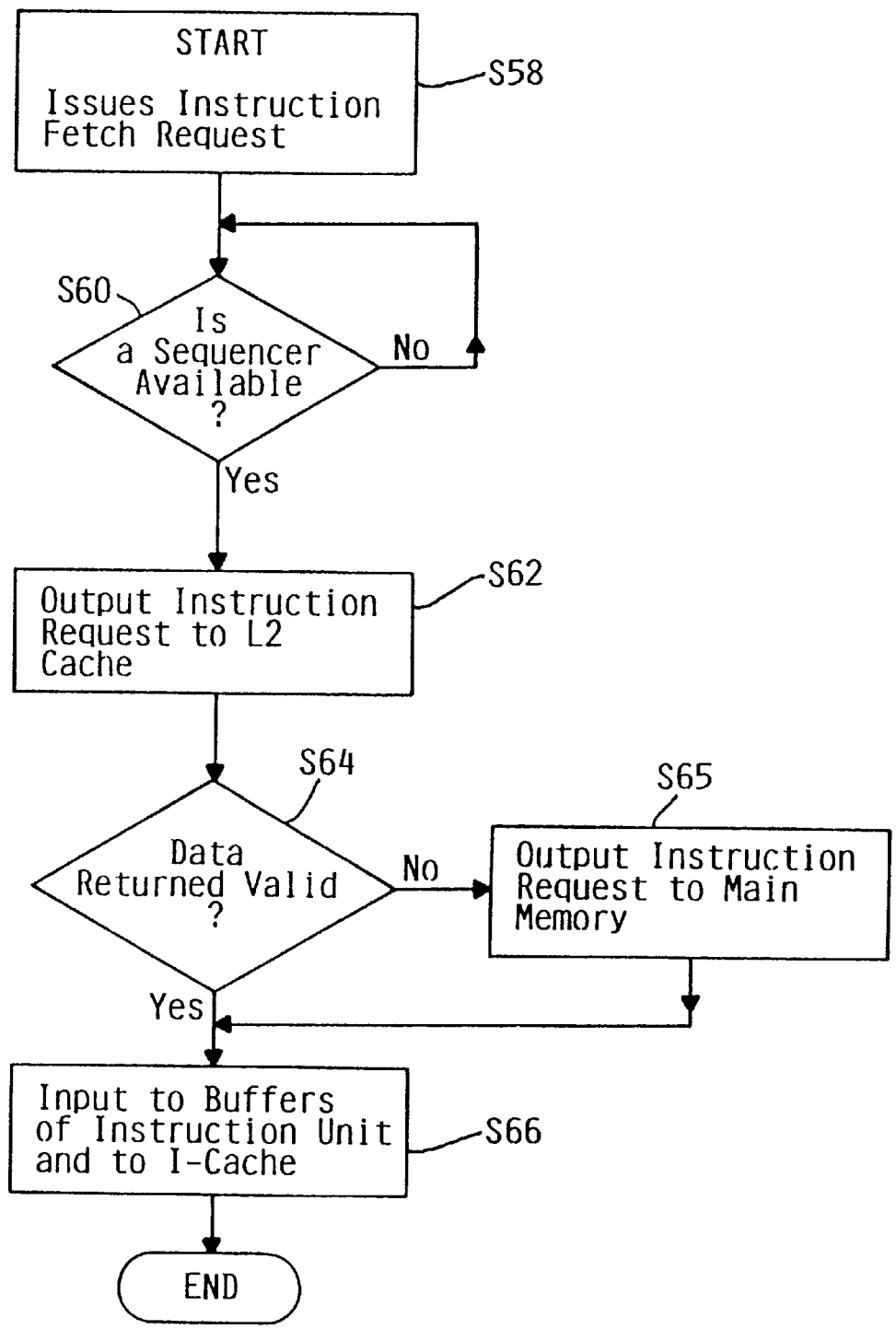
FIG. 8 illustrates the processing of an instruction fetch according to the present invention.

FIG. 8 illustrates the processing of instruction fetch tasks in detail. In step S58, the instruction unit 34 issues the instruction fetch request to the SCU 22. Then, in step S60, the SCU 22 determines whether one of the sequencers 100 is available to handle an instruction fetch task. Once one of the sequencers 100 is available, the available sequencer is assigned the instruction fetch task, and the sequencer outputs an instruction request to the L2 cache 20 in step S62. In response to the instruction request, the L2 cache 20 will output a cache line which may contain the requested instruction. Because more than one real address can map to the same cache address, the data or instructions stored in a particular cache address may not be the requested data or instructions. Based on the addresses stored in the L2 cache directory 108, the sequencer 100 determines whether the data or instructions returning from the L2 cache 20 is the requested data or instructions, and therefore, valid by using well known techniques. If the data being returned by the L2 cache 20 is valid, then in step S66, the sequencer 100 outputs a selection signal to the instruction multiplexer 104 such that the instruction multiplexer 104 outputs the data from the L2 cache 20 directly to the L1 I-cache 18 and the instruction unit 34 in step S66.

If, however, the sequencer 100 determines in step S64 that the data being returned by the L2 cache 20 is not valid, then the sequencer 100 outputs an instruction request to the main memory 14 in step S65. When the main memory 14 is going to output the requested data, the sequencer 100 receives notification from the main memory 14 via a control line. In response, the sequencer 100 outputs a selection signal to the instruction multiplexer 104 such that the instruction multiplexer 104 outputs the data output from the main memory 14 to the L1 I-cache 18 and the instruction unit 34 in step S66. In this manner, the instruction unit 34 can immediately begin processing the requested instruction without having to wait for (1) the instruction to first be stored in the L1 I-cache 18 and (2) the requested instruction to be accessed from the L1 I-cache 18.

Processing Data Fetch Requests

In response to a data request from the execution units, the SCU 22 obtains the requested data from the L1 D-cache 16, and outputs the data to the execution unit or units requesting the data; hereinafter the "requesting execution unit or units." If the SCU 22 experiences an L1 D-cache miss, then the SCU 22 determines if one of the sequencers 100 is available. If available, the data request task is assigned to the available sequencer 100. Like an L1 I-cache miss, the sequencer 100 first attempts to obtain the data from the L2 cache 20, and if the data is not present therein, the sequencer 100 then requests that data from the main memory 14. As with a requested instruction, the requested data is output from either the L2 cache 20 or the main memory 14 as part of a cache line.

When the sequencer 100 determines that the requested data is returning from either the L2 cache 20 or the main memory 14, the sequencer 100 determines if the execution unit or units requesting the data can accept the requested data. If the requesting execution unit or units can accept the requested data then the requested data is output to the requesting execution unit or units before the requested data is stored in the L1 D-cache 16. If the requesting execution unit or units cannot accept the requested data, then the data is first stored in the cache line buffer 21 and then transferred to the L1 D-cache 16. If the requesting execution unit or units become available before the cache line containing the requested data is completely transferred to the L1 D-cache 16, the requested data is output from the cache line buffer 21 to the requesting execution unit or units.

Figure 9:
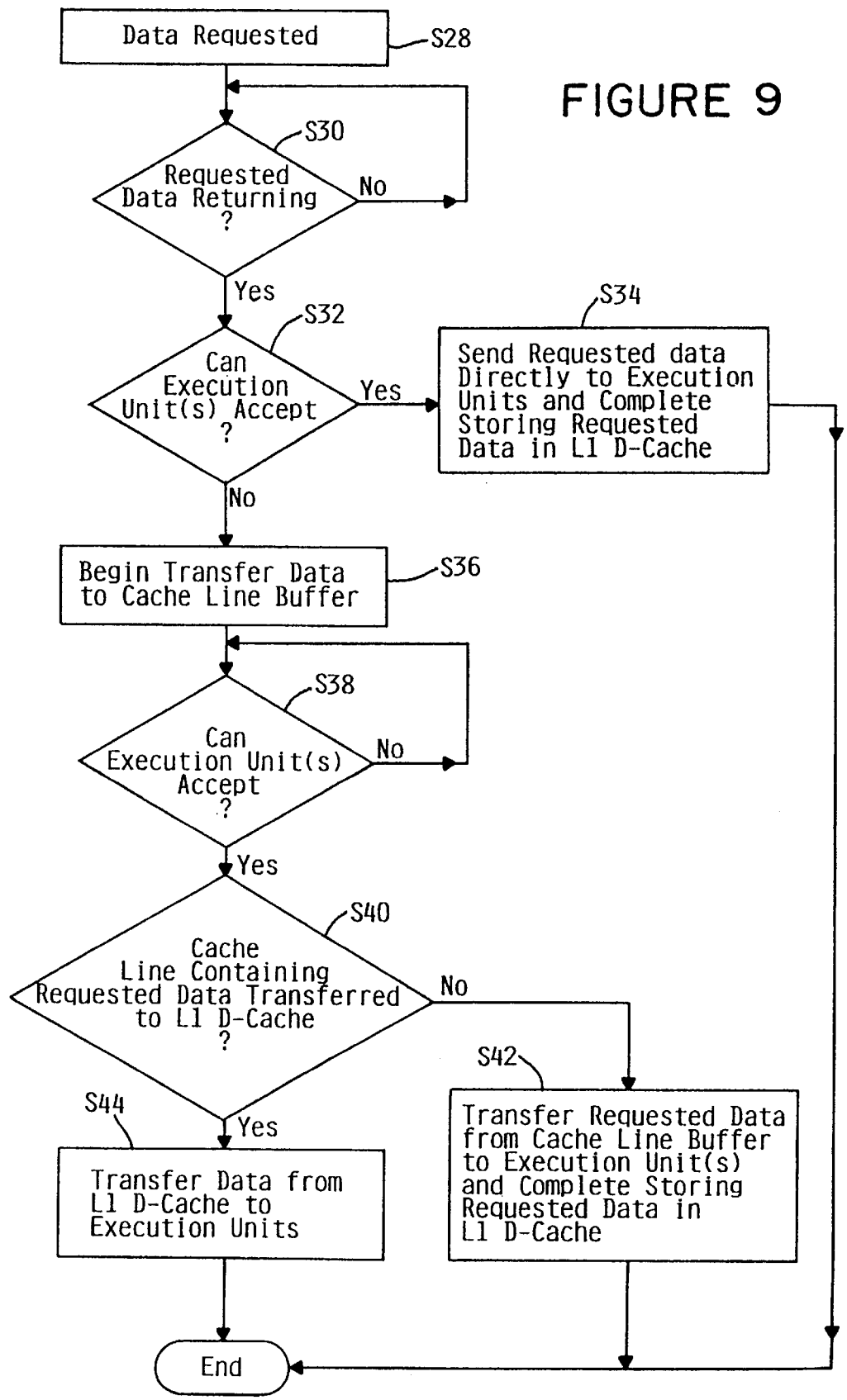
FIG. 9 illustrates the processing of a data request according to the present invention.

FIG. 9 illustrates, in detail, the processing of a data fetch task once the sequencer 100 assigned the data fetch task has requested the data from either the L2 cache 20 or the main memory 14 in step S28. As shown in FIG. 9, in step S30, the sequencer 100 determines whether or not the cache line containing the requested data is returning from either the L2 cache 20 or the main memory 14 in the manner discussed above with respect to an L1 I-cache miss and FIG. 8.

Once the sequencer 100 determines that the requested data is returning, the sequencer 100 determines in step S32 whether or not the requesting execution unit or units can accept the requested data. Specifically, the sequencer 100 determines whether or not a gap exists in the storage pipeline such that processing of the instruction requiring the requested data can take place. If, in step S32, the sequencer 100 determines that the requesting execution unit or units can accept the requested data, then in step S34, the sequencer 100 outputs a selection signal to the data multiplexer 102 such that the requested data returning from either the L2 cache 20 or the main memory 14 is directly output to the execution units.

The requested data will also be stored by the cache line buffer 21 and subsequently output to the L1 D-cache 16 under the control of the sequencer 100. Specifically, when the data multiplexer 102 outputs the cache line containing the requested data to the execution units, the cache line is also supplied to the cache line buffer 21. The sequencer 100 instructs the cache line buffer 21 to store the cache line. When the cache line buffer 21 begins storing the cache line containing the requested data, the cache line buffer 21 outputs a storage address indicating where in the memory of the cache line buffer 21 the cache line is being stored. The sequencer 100 stores this storage address, and sets a flag corresponding to each component of data in the cache line, e.g., a data word, as that component of data is stored by the cache line buffer 21.

To store the cache line in the L1 D-cache 16, the sequencer 100 uses the storage address to instruct the cache line buffer 21 to output the cache line on a data component basis, for example, word by word. The sequencer 100 also causes the data multiplexer 102 to output the data output from the cache line buffer 21, and instructs the L1 D-cache 16 to store this data.

If, in step S32, the sequencer 100 determines that the requesting execution unit or units are unavailable to accept the data, then in step S36 the sequencer 100 (1) causes the data multiplexer 102 to output the requested data coming from either the L2 cache 20 or the main memory 14, and (2) controls the cache line buffer 21 to store the requested data. The sequencer 100 continues to monitor the execution units in step S38 to determine when the requesting execution unit or units become available to accept the requested data.

When the sequencer 100 determines that the requesting execution unit or units are available to accept the data, the sequencer 100 then determines in step S40 whether or not the cache line containing the requested data has been completely transferred from the cache line buffer 21 to the L1 D-cache 16. The sequencer 100 makes this determination by determining whether it has instructed the cache line buffer 21 to output all the data components forming the cache line containing the requested data for storage in the L1 D-cache 16. If the cache line has not been completely transferred, then in step S42 the sequencer 100 (1) controls the cache line buffer 21 to output the requested data, and (2) outputs a selection signal to the data multiplexer 102 such that the data multiplexer 102 outputs the requested data output from the cache line buffer 21. The execution units then receive and process the requested data. Storage of the cache line containing the requested data in the L1 D-cache 16 is then, eventually, completed.

In step S40, if the sequencer 100 determines that the cache line containing the requested data has been completely transferred to the L1 D-cache 16, then in step S44 the sequencer 100 (1) controls the L1 D-cache 16 to output the requested data, and (2) outputs a selection signal to the data multiplexer 102 such that the data multiplexer 102 outputs the requested data output from the L1 D-cache 16. The execution units then receive and process the requested data.

By transferring the requested data to the execution units as soon as the execution units become available after the requested data returns from either the L2 cache 20 or the main memory 14, processing efficiency is increased. In many instances, the execution units will not have to wait for the data to be transferred from at least one of (1) high level memory to a cache line buffer, (2) the cache line buffer to an L1 D-cache, and (3) the L1 D-cache to the execution units.

In the methodology discussed above, the sequencers 100 obtain the requested data from the cache line buffer 21 after transfer of the cache line containing the requested data to the cache line buffer 21 has begun and until the cache line has been completely transferred to the L1 D-cache 16. In an alternative embodiment, even though transfer of the cache line containing the requested data to the cache line buffer 21 has begun, the sequencer 100 will cause the requested data to be output directly from the L2 cache 20 or the main memory 14 to the execution units if the execution units become available before the requested data has been transferred to the cache line buffer 21 as part of the cache line.

Background Completion of Instructions

Another operation of the present invention, in a multi-thread environment, will now be described. According to this operation, the data processing system according to the present invention completes processing an instruction and associated fetch request for a first thread while executing instructions of a second thread to increase processing efficiency upon a thread-switch back to the first thread.

If an instruction for a first thread in the storage pipeline experiences an L1 D-cache miss and the instruction unit 34 decides to switch threads, the instruction unit 34 begins processing a second thread. Meanwhile, the instruction unit 34 assigns the task of fetching the missing data to the SCU 22, and the SCU 22 requests the missing data from at least one of the L2 cache 20 and the main memory 14.

During processing of the second thread, unused slots will appear in the storage pipeline because it is not possible to always dispatch instructions to completely keep the pipelines filled. After the requested data returns from the L2 cache 20 or the main memory 14, the SCU 22 routes the instruction from the first thread having received the cache miss to an unused slot in the storage pipeline. Consequently, this instruction from the first thread will be processed along with the instructions from the second thread. Because the second thread is the thread currently dispatched to the pipelines, the instructions of the second thread are considered the foreground instructions and the second thread is considered the foreground thread. Therefore, the instruction of the first thread processed along with the foreground instructions is considered a background instruction and the first thread is considered a background thread.

In this manner, the instruction of the first thread having experienced the cache miss can be processed in the background such that upon a thread switch back to the first thread, the instruction of the first thread having experienced the cache miss does not need to be dispatched to the pipeline. Instead, instructions dependent thereon can be immediately dispatched to the pipeline; thus, saving a complete processing cycle over conventional architectures. The background completion operation will be discussed in detail with respect to FIGS. 10A–11.

Figure 10A:
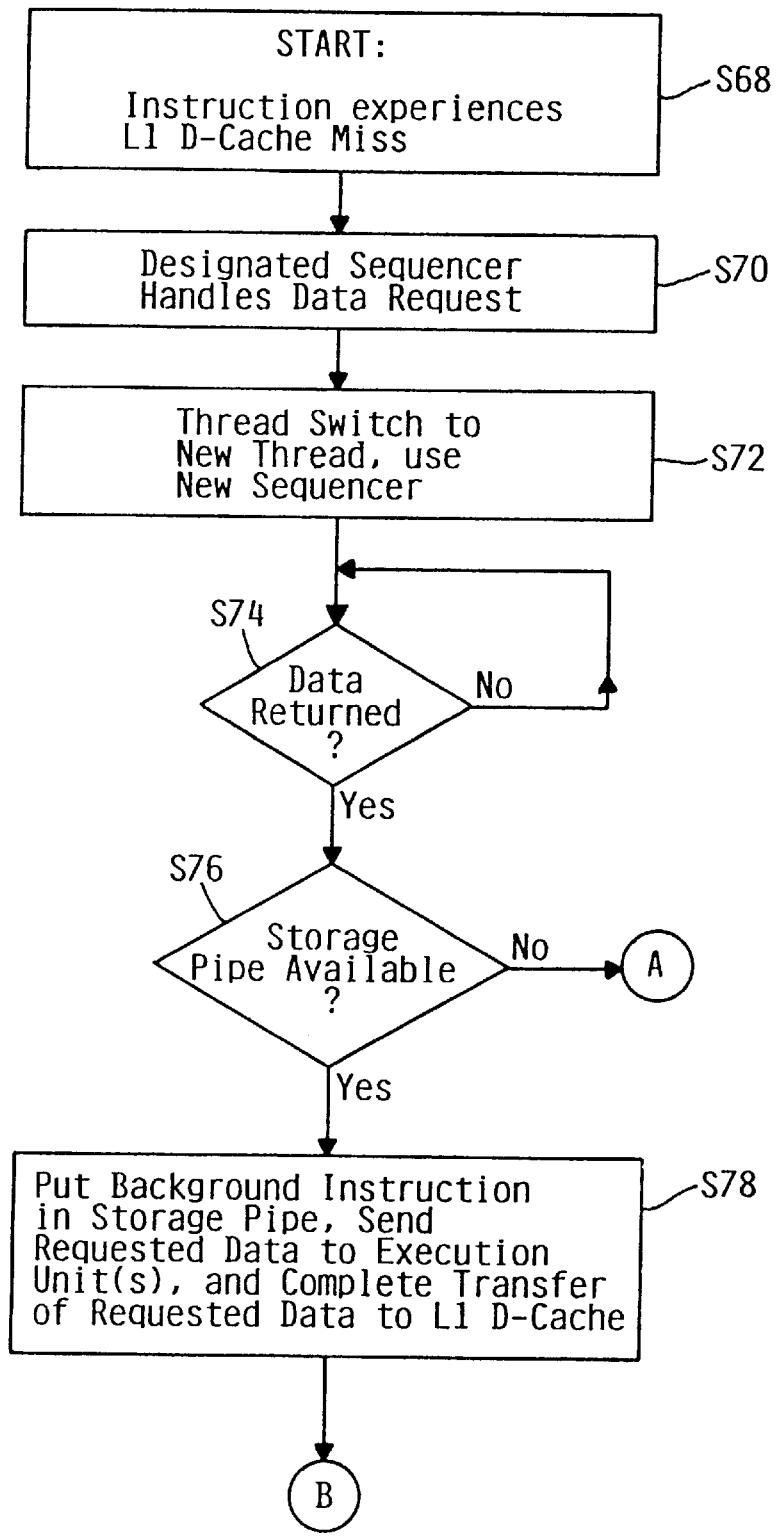
FIGS. 10A–10B illustrate the background completion processing according to the present invention.
Figure 10B:
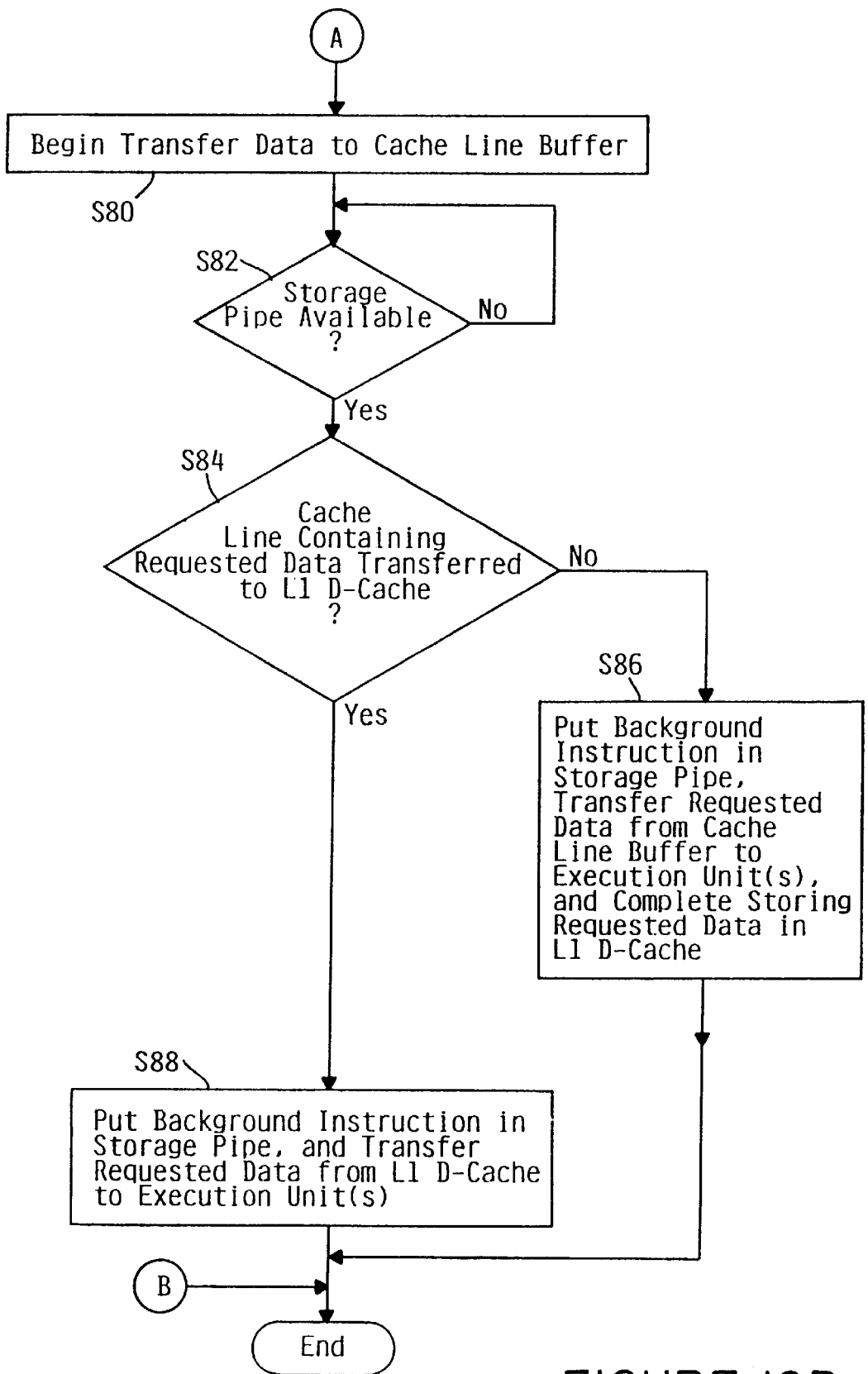

FIGS. 10A and 10B illustrate the background completion processing according to the present invention, while FIG. 11 illustrates an example of instructions flowing through the pipeline structure of the present invention during this operation. For the purposes of discussion, assume that instructions for a first thread, thread 0, are being processed by the processor 12. Accordingly, FIG. 11 illustrates instructions for thread 0 being processed through the pipelines. To indicate that the instructions are from thread 0, the instructions have been labelled with the suffix 0.

As shown in FIG. 11, in cycle 3, instruction A0 experiences an L1 D-cache miss. Unlike prior art data processing systems, however, instructions B0, C0, and D0 which do not depend on instruction A0 are committed in cycle 3 such that these instructions will not need to be redispatched upon a thread switch back to thread 0. As shown in FIG. 10A, this is the start of the background completion processing, step S68.

Once a foreground instruction experiences an L1 D-cache miss, the SCU 22 determines whether one of the sequencers 100a, 100b, or 100c from the sequencers 100 is available to process the data request task associated with the L1 D-cache miss. If one of the sequencers 100 is available, the available one of the sequencers 100 is designated to handle the instruction fetch task, and in step S70 the designated sequencer requests the data from either the L2 cache 20 or the main memory 14 in the manner discussed above with respect to the L1 I-cache miss and FIG. 8.

Meanwhile, as shown in cycle 4 of FIG. 11, in step S72 of FIG. 10A, a thread switch occurs. While for the purposes of discussion, the description of the background completion processing of the present invention assumes a thread switch on an L1 D-cache miss, any thread switching methodology can be used in conjunction with the present invention. For instance, thread switching may occur on an L2 cache miss and/or a TLB cache miss, etc., instead of an L1 D-cache miss.

Accordingly, as shown in cycle 4 of FIG. 11, the pipelines begin processing instructions of the new thread, thread 1. To indicate that the instructions being processed are from thread 1, the suffix of 1 has been added to the instructions in FIG. 11.

In step S74 of FIG. 10A, the designated sequencer 100 determines whether the requested data is returning from either the L2 cache 20 or the main memory 14. Once the designated sequencer 100 determines that the requested data is returning, the designated sequencer 100 determines in step S76 if the storage pipeline is available. Namely, the designated sequencer 100 determines whether or not a foreground instruction has been dispatched to the first stage of the storage pipeline. If an instruction of the foreground thread has not been dispatched to the first stage of the storage pipeline, then the storage pipeline is available. Accordingly, in step S78 the designated sequencer 100 routes the background instruction which experienced the cache miss from the background thread, thread 0, to the storage pipeline, and causes the requested data returning from either the L2 cache 20 or the main memory 14 to be directly output to the execution units. As discussed above, this latter operation is accomplished by outputting a selection signal to the data multiplexer 102 in FIG. 6B such that the data multiplexer 102 outputs the requested data output from one of the L2 cache 20 and the main memory 14. Under the control of the designated sequencer 100, the requested data is also stored in the cache line buffer 21, and subsequently stored in the L1 D-cache 16 in the same manner as discussed above with respect to step S34 of FIG. 9.

If in step S76, the designated sequencer 100 determines that the storage pipeline is not available, then processing proceeds to step S80 in FIG. 10B. In step S80, transfer of the cache line containing the requested data to the cache line buffer 21 begins. The designated sequencer 100 continues to monitor the storage pipeline in step S82 to determine its availability. Once the storage pipeline becomes available, the designated sequencer 100 determines in step S84 whether the cache line containing the requested data has been completely transferred from the cache line buffer to the L1 D-cache 16 in the same manner as discussed above with respect to step S40 of FIG. 9.

If the cache line containing the requested data has not been completely transferred to the L1 D-cache 16, then in step S86, the sequencer 100 (1) routes the background instruction which experienced the cache miss to the storage pipeline, (2) controls the cache line buffer 21 to output the requested data, and (3) outputs a selection signal to the data multiplexer 102 such that the requested data output from the cache line buffer 21 is output by the data multiplexer 102 to the execution units. Under the control of the designated sequencer 100, the cache line buffer 21 will complete the transfer of the cache line containing the requested data to the L1 D-cache 16.

If, in step S84, the designated sequencer 100 determines that the cache line containing the requested data has been completely stored in the L1 D-cache 16, the designated sequencer 100 (1) routes the background instruction which experienced the cache miss to the storage pipeline, (2) causes the L1 D-cache 16 to output the requested data, and (3) outputs a selection signal to the data multiplexer 102 such that the data multiplexer 102 outputs the requested data from the L1 D-cache 16 to the execution units.

An example of the above discussed background completion processing is illustrated in FIG. 11. As shown in FIG. 11, the data requested based on the cache miss experienced by instruction A0 returns in cycle 6. The illustration of FIG. 11 assumes that an instruction from the foreground thread, thread 1, has not been dispatched to the storage pipeline in this cycle. Accordingly, the instruction A0 is routed to the storage pipeline and appears in stage 1 of the storage pipeline in cycle 6. Of course, it will be understood by one skilled in the art that when the data returns, the foreground thread may be utilizing the storage pipeline facility such that several cycles will pass before the storage pipeline facilities become available for background completion. Since the instruction A0 is being dispatch to the storage pipeline while thread 0 remains a background thread, instruction A0 has been illustrated as "ao" to show that it is a background instruction.

Once the background instruction has been routed to the storage pipeline, such as shown in cycle 6 of FIG. 11, the instruction is processed such as shown in cycles 7 and 8. When the background thread corresponding to this background instruction is switched to the foreground, the instruction completed in the background does not need to be dispatched to the storage pipeline. Instead, those instructions following the instruction completed in the background can be dispatched to the pipelines.

For example, as shown in FIG. 11, in cycle 9 the instruction M1 of thread 1 experiences a cache miss. Accordingly, a thread switch occurs in cycle 10. Instead of having to dispatch instructions A0–D0 to the beginning of the storage pipeline, instructions E0, F0, G0, and H0, are dispatched to the pipelines. Processing then continues on thread 0 such as shown in cycle 11. If, however, instruction A0 could not be completed in the background, then instructions A0–D0 are redispatched upon a thread switch back to thread 0.

As a comparison of FIG. 11 with FIG. 5 shows, because instructions B0–D0 were committed in cycle 3 and instruction A0 was completed in the background, the method for performing background completion of cache misses according to the present invention reduces processing time by an entire cycle.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed:

1. A data processing system, comprising:

a plurality of execution units forming a plurality of processing pipelines, said plurality of processing pipelines processing instructions and including a storage pipeline;

an instruction unit outputting instructions to said plurality of execution units, and controlling execution of multiple threads by said plurality of execution units, a thread currently being executed by said plurality of execution units referred to as a foreground thread, and a thread not currently being executed by said plurality of execution units referred to as a background thread, having at least one background instruction;

a storage control unit capable of receiving both a data fetch request resulting from a data cache miss, and an instruction fetch request resulting from an instruction cache miss either or both of said cache misses occurring when said background thread was a previously executing foreground thread, said storage control unit monitoring said storage pipeline to determine when said storage pipeline during the execution of said foreground thread to determine when said instruction unit does not dispatch an instruction from said foreground thread to said storage pipeline and hence said storage pipeline becomes available, in the case of said data fetch request, said storage control unit, routing said background instruction to said storage pipeline when said storage control unit determines that said storage pipeline is available and directly outputting requested data associated with said background instruction to said plurality of execution units; and in the case of said instruction fetch request, said storage control unit directly outputting said requested instruction to said instruction unit.

2. The data processing system of claim 1, wherein said execution units complete processing of instructions in said background thread, which are in a final stage of each of said plurality of pipelines other than said storage pipeline, prior to said background thread being switched by said instruction unit from said foreground to said background.

3. The data processing system of claim 2, wherein said instruction unit, when switching said background thread back to said foreground, does not dispatch those instructions which said execution units completed processing, and does not dispatch said background instruction to said plurality of processing pipelines.

4. The data processing system of claim 1, wherein said storage control unit includes a plurality of sequencers, and when said storage control unit receives said data fetch request or said instruction fetch request, said storage control unit assigns said data fetch request or said instruction fetch request to one of said sequencers if available such that more than one data fetch request and/or instruction fetch request can be handled at a time.

5. The data processing system of claim 1, further comprising:

a level one data cache;

a level one instruction cache;

memory for storing data and instructions; and wherein said storage control unit capable of receiving an instruction fetch request upon a level one instruction cache miss and a data fetch request from said plurality of execution units upon a level one data cache miss;

said storage control unit requests data from said memory when said requested data is not in said level one data cache and directly outputs said requested data returning from said memory to said plurality of execution units if said storage pipeline is available during the execution of said foreground thread when said requested data returns from said memory; and said storage control unit requests said background instruction from said memory, and directly outputs said requested background instruction returning from said memory to said instruction unit.

6. The data processing system of claim 5, wherein said memory further comprises:

at least one intermediate cache; and a main memory, both of which store data and instructions.

7. The data processing system of claim 6, wherein said storage control unit includes a buffer which temporarily stores said requested data returning from said memory prior to outputting said data to said level one data cache.

8. The data processing system of claim 7, wherein said storage control unit transfers said requested data from said buffer to said plurality of execution units before storage of said requested data to said level one cache if said storage control unit determines that said storage pipeline becomes available during the execution of said foreground thread.

9. The data processing system of claim 8, wherein said storage control unit transfers said requested background instruction from said buffer to said instruction unit before storage of said requested background instruction to said level one instruction cache.

10. A method of data processing in a data processing system, said method comprising:

dispatching instructions from an instruction unit to a plurality of execution units forming a plurality of processing pipelines, one of which is a storage pipeline;

processing a foreground thread currently being executed by said plurality of execution units;

suspending processing of a background thread not being currently executed by said plurality of execution units;

issuing a data fetch request to a storage control unit for a background instruction when said background thread was a previously executing foreground thread;

issuing an instruction fetch request to a storage control unit for a background thread when said background thread was a previously executing foreground thread;

monitoring of said storage pipeline by said storage control unit to determine when said storage pipeline becomes available because when during the processing of said foreground thread said instruction unit does not dispatch an instruction of said foreground thread to said storage pipeline;

in the case of said data fetch request said storage control unit routing an instruction associated with said data fetch request to said storage pipeline when said monitoring step determines that said storage pipeline is available during the processing of said foreground thread and outputting requested data associated with said associated instruction to said plurality of execution units; and in the case of said instruction fetch request, said storage control unit outputting requested instructions to said instruction unit when said requested instructions are received.

11. The method of claim 10, further comprising:

completing, in said plurality of execution units, processing of instructions in said background thread in a final stage of each of said plurality of pipelines other than said storage pipeline prior to said background thread being switched by said instruction unit from said foreground to said background.

12. The method of claim 11, wherein dispatching, when switching said background thread back to said foreground, instructions from said background thread, other than those instructions completed in said completing step and said background instruction routed in said routing step, to said plurality of processing pipelines.

13. The method of claim 11, further comprising the step of:

assigning said data fetch request and/or said instruction fetch request to one of a plurality of available sequencers in said storage control unit such that more than one data or instruction fetch request can be handled at a time.

14. The method of claim 10, wherein said step of issuing a data fetch request further comprises requesting data from either a level one data cache, an intermediate level data cache or main memory; and said step of issuing an instruction fetch request further comprises requesting instructions from either an intermediate level cache or main memory;

and outputting said requested data directly to said plurality of execution units before storage of said requested data in said level one data cache if said monitoring step determines that said storage pipeline is available during execution of said foreground thread when said requested data returns from said intermediate level cache or main memory, and outputting said requested instruction directly to said instruction unit before storage of said requested instruction in said level one instruction cache.

15. The method of claim 14, wherein said storage control unit includes a buffer which temporarily stores instructions received from said intermediate level cache or main memory prior to outputting said requested instruction to said level one instruction cache, and wherein said outputting step transfers said requested instruction data from said buffer to said instruction unit before said requested instruction is stored in said level one instruction cache.

16. The method of claim 14, wherein said storage control unit includes a buffer which temporarily stores data received from said intermediate level cache or main memory prior to outputting said data to said level one data cache, and wherein said outputting step transfers said requested data from said buffer and said level one data cache to said plurality of execution units if said monitoring step determines that said storage pipeline becomes available during execution of said foreground thread and after data including said requested data has begun to be stored in said buffer.

17. The method of claim 16, wherein said outputting step transfers said requested data from said buffer to said plurality of execution units even though said requested data has not been completely transferred to said level one cache when said monitoring step determines that said storage pipeline is available during execution of said foreground thread.

18. A data processing system, comprising:

a plurality of execution units forming a plurality of processing pipelines including a storage pipeline, said plurality of processing pipelines for processing instructions, a sequence of instructions currently being executed by said plurality of execution units referred to as being a foreground thread and a sequence of instructions not currently being executed by said plurality of execution units referred to as a background thread; said execution units complete processing of instructions in said background thread which are in a final stage of each of said plurality of pipelines other than said storage pipeline prior to said background thread being switched by said instruction unit from said foreground thread to said background thread;

an instruction unit outputting instructions to said plurality of execution units, and controlling execution of at least said foreground and said background thread by said plurality of execution units such that when switching said background thread back to said foreground, said instruction unit does not dispatch those instructions which said execution units completed processing, and does not dispatch said background instruction to said plurality of processing pipelines;

a level one data cache;

a level one instruction cache;

an intermediate cache and main memory, each of which store both data and instructions;

a storage control unit having a plurality of sequencers, said storage control unit to receive a data fetch request resulting from a data cache miss or an instruction fetch request resulting from an instruction cache miss either or both of said cache misses occurring when said background thread was a previously executing foreground thread and assigning said data or said instruction fetch request to one of said sequencers if available such that more than one data and/or instruction fetch request can be handled at a time;

said storage control unit requesting data from said intermediate cache or said main memory when said requested data is not in said level one data cache, and directly outputting said requested data returning from said intermediate cache or said main memory to said plurality of execution units before storing said data in said level one data cache if during execution of said foreground thread said instruction unit is not dispatching an instruction from a foreground thread to said storage pipeline;

said storage control unit requesting instructions from said intermediate cache and said main memory and directly outputs said requested instruction returning from said intermediate cache or said main memory to said instruction unit before storing said instruction in said level one instruction cache.

19. A method of data processing in a data processing system, said method comprising:

dispatching instructions from an instruction unit to a plurality of execution units forming a plurality of processing pipelines including a storage pipeline;

processing said dispatched instructions of a foreground thread currently being executed by said plurality of execution units, processing instructions of a background thread in a final stage of each of said plurality of pipelines other than said storage pipeline prior to suspending processing of a background thread by switching instructions from the background thread out of said to instruction unit;

issuing a data fetch request for a background instruction of said background thread to a storage control unit when said plurality of execution units experienced a level one data cache miss when said background thread was a previously executing foreground thread;

issuing an instruction fetch request for said background thread to said storage control unit when said instruction unit experiences a level one instruction cache miss when said background thread was a previously executing foreground thread;

assigning said fetch requests to one of a plurality of available sequencers in said storage control unit so that more than one of said fetch requests can be handled at a time;

processing said data fetch request by requesting data from either a level one data cache, an intermediate level data cache or main memory;

processing said instruction fetch request by requesting instructions from either said intermediate level cache or said main memory;

monitoring said storage pipeline to determine when said instruction unit does not dispatch an instruction from a foreground thread to said storage pipeline thereby making said storage pipeline available;

routing said background instruction and said data to said storage control unit and then outputting said background instruction to said storage pipeline and outputting data associated with said data fetch request of said background instruction to said plurality of execution units prior to storing said requested data in a level one data cache when said storage pipeline is available;

routing a returned instruction to said storage control unit and then outputting said returned instruction associated with said instruction fetch request of said background thread to said instruction unit prior to storing said requested instruction in said level one instruction cache.

* * * * *